US010529019B2

(12) United States Patent
Newhouse et al.

(10) Patent No.: US 10,529,019 B2
(45) Date of Patent: Jan. 7, 2020

(54) TRADING PLATFORM WITH AUTOMATED NEGOTIATION AND OPTION CROSSING

(75) Inventors: Robert Newhouse, New York, NY (US); Chet Burros, New York, NY (US); Ross Berman, New York, NY (US); Hal Mintz, Mahwah, NJ (US)

(73) Assignee: Trebuchet Holding, LLC, New York, NY (US)

( * ) Notice: Subject to any disclaimer, the term of this patent is extended or adjusted under 35 U.S.C. 154(b) by 1126 days.

(21) Appl. No.: 12/149,443

(22) Filed: May 1, 2008

(65) Prior Publication Data
US 2009/0276363 A1 Nov. 5, 2009

(51) Int. Cl.
*G06Q 40/04* (2012.01)
*G06Q 50/18* (2012.01)

(52) U.S. Cl.
CPC .......... *G06Q 40/04* (2013.01); *G06Q 50/188* (2013.01)

(58) Field of Classification Search
USPC .................................................... 705/35–37
See application file for complete search history.

(56) References Cited

U.S. PATENT DOCUMENTS

| | | | |
|---|---|---|---|
| 6,105,005 A | 8/2000 | Fuhrer | |
| 6,418,419 B1 | 7/2002 | Nieboer | |
| 6,904,411 B2 | 6/2005 | Hinkle | |
| 7,024,387 B1 | 4/2006 | Nieboer | |
| 7,117,176 B2 | 10/2006 | Wallman | |
| 7,149,720 B2 | 12/2006 | Shepherd | |
| 7,171,385 B1 | 1/2007 | Dembo et al. | |
| 7,200,572 B2 | 4/2007 | Beurskens | |
| 7,212,998 B1 | 5/2007 | Muller et al. | |
| 7,231,363 B1 | 6/2007 | Hughes | |
| 7,231,364 B1 | 6/2007 | Cobrinik et al. | |
| 7,246,092 B1 | 7/2007 | Peterson et al. | |
| 7,287,006 B1 | 10/2007 | Kratka | |
| 7,308,428 B1 | 12/2007 | Federspiel et al. | |
| 7,315,839 B2 | 1/2008 | McQuain | |
| 7,315,840 B1 | 1/2008 | Keith | |
| 7,343,325 B2 | 3/2008 | Shaver et al. | |
| 7,356,499 B1 | 4/2008 | Amburn | |
| 7,359,877 B2 | 4/2008 | Malitzis et al. | |
| 7,363,268 B1 | 4/2008 | Howorka | |
| 7,584,140 B2 * | 9/2009 | Brady et al. | 705/37 |

(Continued)

OTHER PUBLICATIONS

International Search Report dated Apr. 13, 2009.

*Primary Examiner* — Abhishek Vyas
(74) *Attorney, Agent, or Firm* — DLA Piper LLP (US)

(57) ABSTRACT

A system and method for trading securities that include at least one options leg is provided. The system generally includes a database, handlers, a network and at least one server. The database stores user information, security information and transaction information. The handlers receive information feeds from at least one public exchange. The at least one server implements an exchange facility that is capable of exchanging information with client terminals to allow the client to initiate at least one offer to trade a security having an option leg, identifying users interested in the offer, broadcasting the offer to the interested users and conducting a defined period auction among the interested users. The system and method also automatically cross the options legs on exchanges and facilitate negotiation when the auction is not consummated.

30 Claims, 12 Drawing Sheets

(56) References Cited

U.S. PATENT DOCUMENTS

| | | | |
|---|---|---|---|
| 2002/0052827 A1 | 5/2002 | Waelbroeck et al. | |
| 2004/0034591 A1* | 2/2004 | Waelbroeck | G06Q 30/0251 |
| | | | 705/37 |
| 2006/0015441 A1* | 1/2006 | Burkhardt et al. | 705/37 |
| 2006/0036531 A1* | 2/2006 | Jackson | G06Q 20/042 |
| | | | 705/37 |
| 2006/0106713 A1 | 5/2006 | Tilly et al. | |
| 2006/0265320 A1* | 11/2006 | Duquette | G06Q 40/04 |
| | | | 705/37 |
| 2008/0306864 A1* | 12/2008 | Foley | G06Q 20/383 |
| | | | 705/37 |

* cited by examiner

FIG. 8

BALLISTA - LOGGED IN AS [USER]

AAPL (INITIATOR)

| | | | | |
|---|---|---|---|---|
| B | APR08 80 CALL (x1) | | S | |
| B | APR08 150 CALL (x1) | | S | |

0 TOTAL @ 0.00 AVG PRICE    MN: 500    TOTAL TRADED: 0
                                        AVG PRICE: 0.00

| SIZE | BID | ASK | SIZE | TRADE | SIZE |
|------|-----|-----|------|-------|------|
| 2500 | 146.50 | | | | |

QUANTITY   PRICE   MIN QTY            CREDIT/DEBIT ▸

@

MIN PRICE  MAX PRICE  TIME IN FORCE   ACCOUNT ▸

CANCEL   SUBMIT

FIG. 9

TRADING PLATFORM WITH AUTOMATED NEGOTIATION AND OPTION CROSSING

FIELD OF THE INVENTION

The present invention relates to systems and methods for trading assets, including securities, on and off public exchanges.

BACKGROUND OF THE INVENTION

Electronic equity markets, such as The Nasdaq Stock Market collect, aggregate, and display trading information to various market participants. Electronic equity markets also provide electronic systems and networks that provide access to the market to traders and allow them to access trading information and liquidity in the marketplace. Using current systems, a trader wishing to build a trading position, particularly a large option position or complex transaction, will communicate with a "broker" or "sales trader" at an Inter-Dealer-Broker. The broker then reaches out to a set of "contra" clients who may be interested in partaking in the other side of the order. The broker acts as a middleman within this paradigm, and negotiates on behalf of both parties. Once the broker obtains the agreement of both sides to a price and quantity to be traded, the broker then does the necessary work to cross the option components by submitting them to an applicable options exchange.

This approach is slow and laborious and results in time to execution to be measured in minutes, and indeed in some cases, even hours. Underlying this lack of efficiency is inefficient communications, which are carried out via electronic mail, phone calls, and/or instant messaging between a trader and one or more brokers and the broker's clients. The inefficiency is compounded when a trader is involved in multiple transactions simultaneously, requiring the trader to personally keep track of numerous individual communications associated with numerous different orders.

Additionally, brokers involved in transactions do not have the same incentives as the trading entities on either side of the broker. Each trader has a natural incentive to seek the lowest price, whereas the broker has the sole incentive to consummate a matching trade, with no sensitivity to trade price.

Still further, options trading, which requires manual options crossing, has historically required large broker commissions. This is unlike other asset classes—brokered equities, futures, etc.—where the standard commission rates have dropped over the last 5 years due to increasing electronic handling of order types.

SUMMARY OF THE INVENTION

According to an embodiment of the present invention, a platform is provided that allows natural parties to place orders (requests for liquidity) for securities, particularly those involving at least one options leg for the purpose of identifying active and passive liquidity in the security. The platform further broadcasts the offer to interested registered users and conducts auctions pursuant to which interested users declare liquidity against pending offers. The platform aggregates liquidity against pending offers, consummates trades where possible and allows the offeror to meet the highest losing bidder in an electronic venue to consummate transactions through negotiation when the auction does not result in a consummated trade. The platform further automatically handles the process of crossing the option legs on exchanges and printing the stock legs as appropriate. In this manner, the platform collects and aggregates passive liquidity and leverages actively to allow trading by parties in complex securities that include at least one options leg in a manner heretofore not possible.

According to one embodiment of the invention, a system for trading securities, including at least one options leg, includes a database, at least one handler, a network and at least one server. The database stores user information, security information and transaction information. The at least one handler receives information feeds from at least one public exchange. The network couples the database, feed handlers and at least one server together and allows access to the at least one server from client terminals. The servers implement an exchange facility that is capable of exchanging information with client terminals to allow any client to initiate at least one offer to trade a security having an options leg, identifying users interested in the offer, broadcasting the offer to the interested users and conducting a defined period auction among the interested users.

The system is further capable of receiving liquidity from the interested users and consummating a trade based on the offer and received liquidity. It is further is capable of receiving liquidity from at least one public exchange and consummating the trade based on the offer, received liquidity and additional liquidity from the at least one public exchange. It is still further capable of concluding the auction without consummating a transaction and initiating a negotiation between an initiator of the offer and at least one of the losing bidders, generally the closest losing bidder. The auctions may be exclusive to the initiating bidder for a period of time and, upon consummation of trades using the exchange facility, the options legs may be automatically crossed on public exchanges with any price differences offset from stock securities associated with the trade where applicable. The trades may typically be tied transactions or block options trades, but are not limited to such trades.

According to another embodiment of the present invention, a method of trading a security having at least one option component, includes: providing a display having a show pane and an auction pane; setting an interest criteria for trade offers having at least one option leg; displaying incoming trade offers corresponding to the interest criteria in the show pane; selecting to view liquidity associated with particular incoming trade offers; prompting the user to declare liquidity associated with the incoming trade offer to allow the user to participate in an auction associated with the trade. The method may further include providing an indication to the user of whether the user consummated a trade based on the liquidity declared; and prompting the user to negotiate with an entity that initiated the trade offer when the trade is not consummated. This negotiation may be provided through an electronic interface.

According to another embodiment of the present invention, a method for trading securities including at least one options leg, includes storing user information, security information and transaction information; receiving information feeds from the at least one the exchange and trade information from at least one client system; exchanging messages with the client terminals; initiating at least one offer to trade a security having an option leg based on information received from one of the client terminals; identifying users interested in the offer; broadcasting the offer to the interested users; and conducting a defined period auction among the interested users. The method may further include receiving liquidity from the interested users and consummating a trade based on the offer and received liquidity. The method may further include: receiving liquidity from at least one public exchange; and consummating the trade based on the offer, received liquidity and additional liquidity from the at least one public exchange.

BRIEF DESCRIPTION OF THE FIGURES

The above described features and advantages of the present invention will be more fully appreciated with reference to the appended figures.

FIGS. 7-11 depict views of illustrative graphical user interfaces for allowing users to interact with the trading platform according to an embodiment of the present invention.

DETAILED DESCRIPTION

Figure 1:
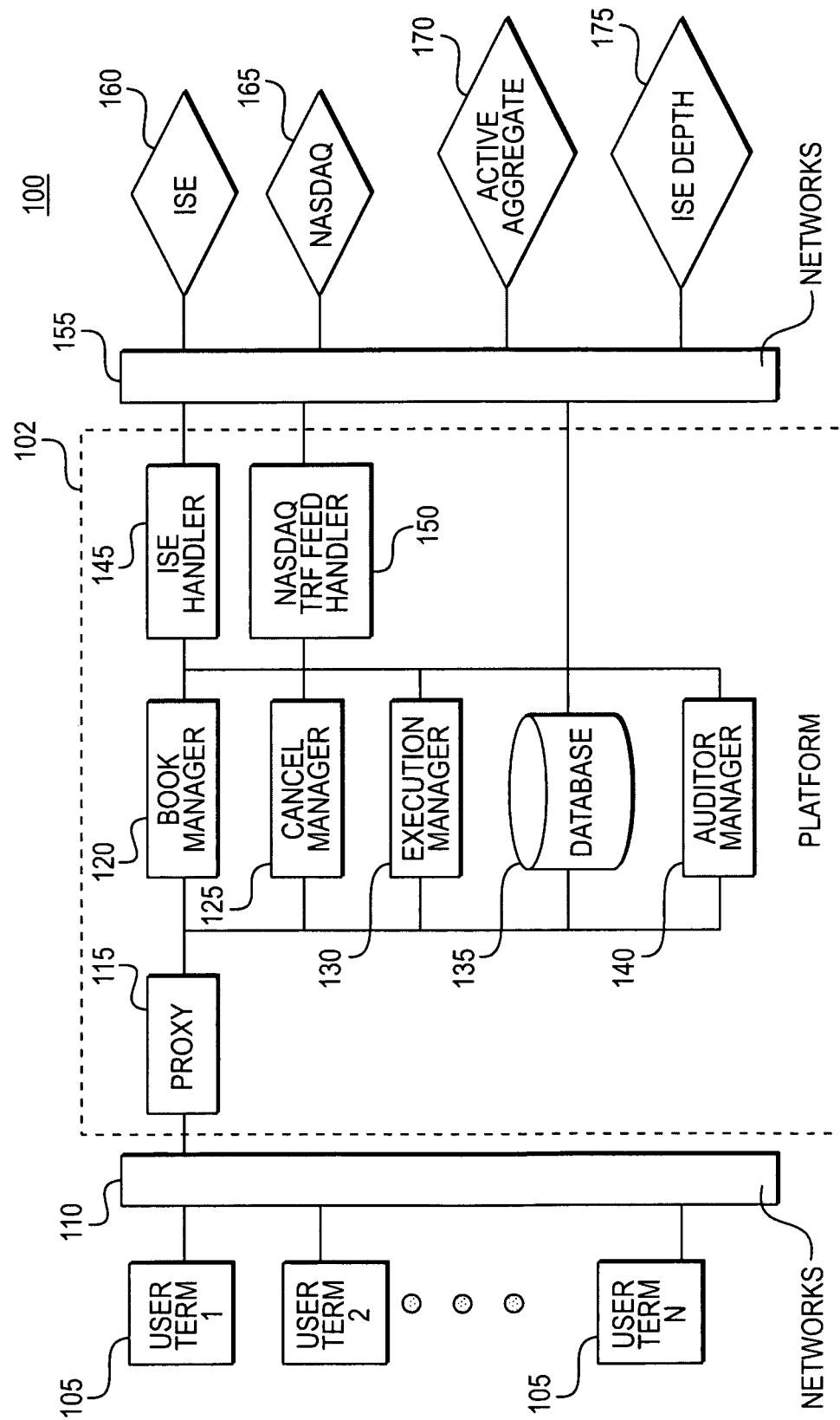
FIG. 1 depicts a system for trading securities according to an embodiment of the present invention.

According to an embodiment of the present invention, a platform is provided that allows natural parties to initiate trading in securities having at least one options leg by creating time auctions, allowing other natural parties to participate in auctions by supplying liquidity in the securities being auctioned, and allowing parties to meet in an electronic venue to consummate transactions facilitated through the auction, and handle the associated process of crossing the option legs and printing the stock legs as appropriate to complete the transaction and remain compliant with securities trading regulations. The platform breaks down barriers that exist today in trading options through brokers and thus facilitates matching natural parties to produce significant efficiencies in the trading of securities involving at least one options leg and to realize additional advantages over brokered trading systems.

Below are definitions for certain terms used herein that will facilitate understanding embodiments of the present invention.

Option

An option is the right to by a stock, commodity or other asset or instrument at a stated price during a stated time period. Options are generally utilized in 2 distinct ways; 1) to establish a directional bet on an underlying stock by entering into options contracts; or 2) to trade the expansion and contraction of volatility in the options themselves, which requires an offsetting stock transaction or hedge, through a Volatility (Tied or Delta Neutral) transaction.

Block Option Transactions

Trades consisting of 1 or more option legs and exceeding 500 contracts in size per leg. This is a directional play with no stock component.

Tied (Volatility) Transactions

Trades consisting of 1 or more option legs, combined with an offsetting (hedge) stock component that reduces or eliminates directional risk and effectively leaves only the volatility to fluctuate, hence a volatility type trade.

Active Liquidity

This type of liquidity refers to venues where the intent to trade a security is published and reflects an actionable bid or offer that initiators can trade against:

Option Exchanges

Retail, firm, and market-maker orders are posted to the 6 domestic option exchanges, and are a source of liquidity that can be traded against electronically.

Stock Exchanges and ECN's

There are many exchanges in various countries, including in the United States NYSE, Nasdaq, and ECN's among others, where orders are published and executable, constituting a source of liquidity to trade against.

Complex Order Books

These are trades with more than 1 leg (spreads, tied transactions, conversion/reversals, combos). The ISE and CBOE have live books containing orders for such complex order books, with NYSE Area offering similar capabilities in 2Q 2008.

Passive Liquidity

Passive liquidity is a term that means unposted liquidity that may not exist in any form until an appropriate query is issued.

Marketmakers

Marketmakers can provide passive liquidity for solicited orders outside of the NBBO, in addition to providing natural liquidity to tied transactions.

Banks

As defined previously, a bank may facilitate an initiated order, acting as a liquidity source of last resort.

Hedge Funds

Entities that are willing to provide liquidity for initiated orders, but do not display indications of that liquidity on a posted market.

Liquidity Aggregators

Entities that act as an intermediary for the purposes of manually sourcing liquidity for an initiated order.

Floor Brokers

Floor brokers can obtain unposted liquidity from exchange marketmakers by requesting a specific market in a tied or block transaction.

Inter-Dealer Brokers

These entities specialize in matching organic counterparties in tied and block transactions by leveraging relationships with multiple liquidity providers that can act as contras to an initiated order.

Sell-Side Agency Desks

These entities offer solicitation services similar to an IDB, as well as other ancillary brokerage functions.

System Overview

FIG. 1 depicts a system 100 for trading securities according to an embodiment of the invention. The securities traded may include any type of securities. However, in a preferred embodiment the trades executed include trades having at least one options leg according to an embodiment of the present invention, such as tied transactions and block options transactions. Referring to FIG. 1, the system 100 includes a platform 102 that comprises a proxy 115, a book manager 120, a cancel manager 125, a database 135, an auditor manager 140, an ISE handler 145, a NASDAQ TRF Feed Handler 150. In addition, the platform is connected to client terminals and systems 105 through a network 10 and to different exchanges via a network 155.

The proxy 115 is generally implemented on a server, which may include one server or more than one "hot" server to provide redundancy. The proxy executes program instructions to communicate with the client systems according to mutually compatible protocols, generally including TCP/IP protocols and financial network protocols, in order to provide interactive displays to the client terminals and exchange user authentication information and trading information with client terminals and systems 105.

The proxy is generally coupled to one or more client terminals or systems 105 via the network 110. The client terminals generally-comprise a general purpose computer with a processor, memory, display, keyboard, pointing device, network interface and communications and display software, for example, such as a browser. However, the client terminals may also be handheld and other types of devices that allow display and exchange of information with remote devices and networks.

The proxy 115 serves registration and login displays to users at client terminals, stores registration information including userid and password information for each user in the database 135 and authenticates users through the login process. The proxy may also serve interactive screens to the user terminals and systems 105 allowing users at the terminals to initiate trade orders or respond to initiated orders by offering liquidity in the identified securities against which to trade. The proxy may further include software that acts as a "throttle" to limit the number of messages per second from a user to keep users from overwhelming the platform.

The network 110 may comprise any type of network or network connection for transferring information electronically between computers or other devices. It may comprise electrical, optical or wireless communications links that are direct or indirect through one or more interconnected computers. The network may also be a public network, a private network or a combination of public and private networks.

The proxy 115 within the platform 102 may further be coupled to the other elements of the platform through an internal data network or interconnections, and in particular to the exchange facility, which includes the book manager 120, the cancel manager 125, the execution manager 130, the database 135 and the audit manager 140.

The book manager 120 is implemented on a server (or multiple hot servers for redundancy) and executes program instructions to provide trading functionality according to embodiments of the present invention. In this regard, the book manager may: (i) receive initiated orders for trades, including trades having at least one option leg; (ii) define and conduct auctions (limit book) of securities, including tied transactions and block options trades involving registered users of the system to provide liquidity from public exchanges; (iii) receive liquidity information from registered users and public markets; (iv) match initiated orders with liquidity from contra users and public markets; (v) facilitate a negotiation after an auction between the order initiator and one or more of the losing bidders, including the most attractive losing bidders based on some criteria, including the closest losing bidder; and (vi) produce and transmit information and interactive displays to user terminals and systems 105 to facilitate collection and exchange of trading information used during the auction process for order matching. The book manager may be implemented in multiple servers to facilitate scalability of the system. In this regard, for example, the servers may be allocated particular securities symbols and be dedicated to conducting auctions of those securities. Alternatively, other load balancing techniques may be used to allocate processing among multiple servers. These techniques may be applied to any of the servers described herein.

The cancel manager 125 is a server (or multiple hot servers) that is coupled to the other elements of the platform 102 and exchange facility that collects information from the user about the duration of the auction and time information generally and cancels the auction when it has been terminated by the initiating user or otherwise is over because the auction time has expired or the order is cancelled based on defined rules or implicit cancellation (BBO). According to one embodiment of the invention, the initiator initiates a trade having one or more options leg in a particular security and is given exclusivity on the trading of that security through the platform for a defined period of time, for example, up to five minutes. The cancel manager 125 and the book manager 120 set up the exclusive auction and the cancel manager ends each auction when the duration expires or it is otherwise cancelled.

The execution manager is a server (or multiple hot servers) that is used to reprice legs of a transaction for public markets and submit customer crosses to the exchanges. The execution manager applies repricing logic where applicable to reprice complex transactions so that they can be crossed on public exchanges. In this regard, in a tied transaction, the options legs may be adjusted to exchange based prices and the resulting changed value offset against the stock price for printing on the exchanges. This enables compliance with trading regulations. The execution manager performs the repricing and communicates the repriced transactions to the public exchanges for publishing.

Once a match occurs within Ballista, a cross then needs to be conducted for the option components of the trade, and a print for the equity component. Ballista has written a computer-run algorithm that takes a match between 2 parties, and handles the business logic associated with putting the trade on the tape.

As a further example, if a match is between 2 customer parties, the repricing engine splits the option and stock trades, and crosses the option components using a Customer Match order type on the ISE. The option components, regardless of the agreed-upon price of the trade, are "repriced" to allow printing within the current ISE BBO. Once executed, the market value added or subtracted from the option components in order to reprice it within the BBO is then added to the equity component. The equity component of the trade is printed to NASDAQ TRF using a contingent trade identifier. Since the price of the equity component has been altered to allow the option component to cross within the BBO, the equity leg of the trade may fall outside of the underlying security's current NBBO; doing so remains compliant with applicable regulations, as contingent trades are exempt from equity trade-through rules under the 611A exemption.

If the match occurs with a FIRM or MM capacity account on one or both sides of the trade, the trade is split with the option components being repriced appropriately and sent to the applicable exchange for a cross, with the stock then being printed to NASDAQ TRF using the contingent trade exemption. In certain cases, if the order is marketable as is without the need to reprice, the repricing engine may submit the cross in its entirety along with equity components, onto the ISE, CBOE or other exchange for a complex cross.

The ISE handler 145 is used to communicate information feeds from the ISE 160 to the platform so that the information may be made available to users 105 and also may be used by the other elements of the platform 102, and particularly the book manager 120, to facilitate mating orders with liquidity from exchanges including the ISE 160 and other sources. There may be additional feeds, including NASDAQ feed 150 and feeds for other exchanges and sources of liquidity further are coupled to the platform to bring the liquidity into the platform to trade against and to make market information available to users 105. Additional market data and information from blocks 170 and 175 may be brought into the platform sources of information about market prices and orders.

The database 135 is used to store information generated and used by the platform 102. In this regard, it may store: user credential information, including names, address, login, password, organization and other information associated with users and organizations; trading limits information for users and organizations; a securities master list of recognized securities or assets that may be traded on the platform; details of every action taken by users of the system, including initiated offers, consummated trades and repriced and crossed trade information.

The audit manager 140 may be implemented by one or more servers and is used to collect, monitor and display information about the platform, trades being handled by the system, and spread messages to facilitate monitoring the platform for malfunction, or other system problems.

Figure 2:
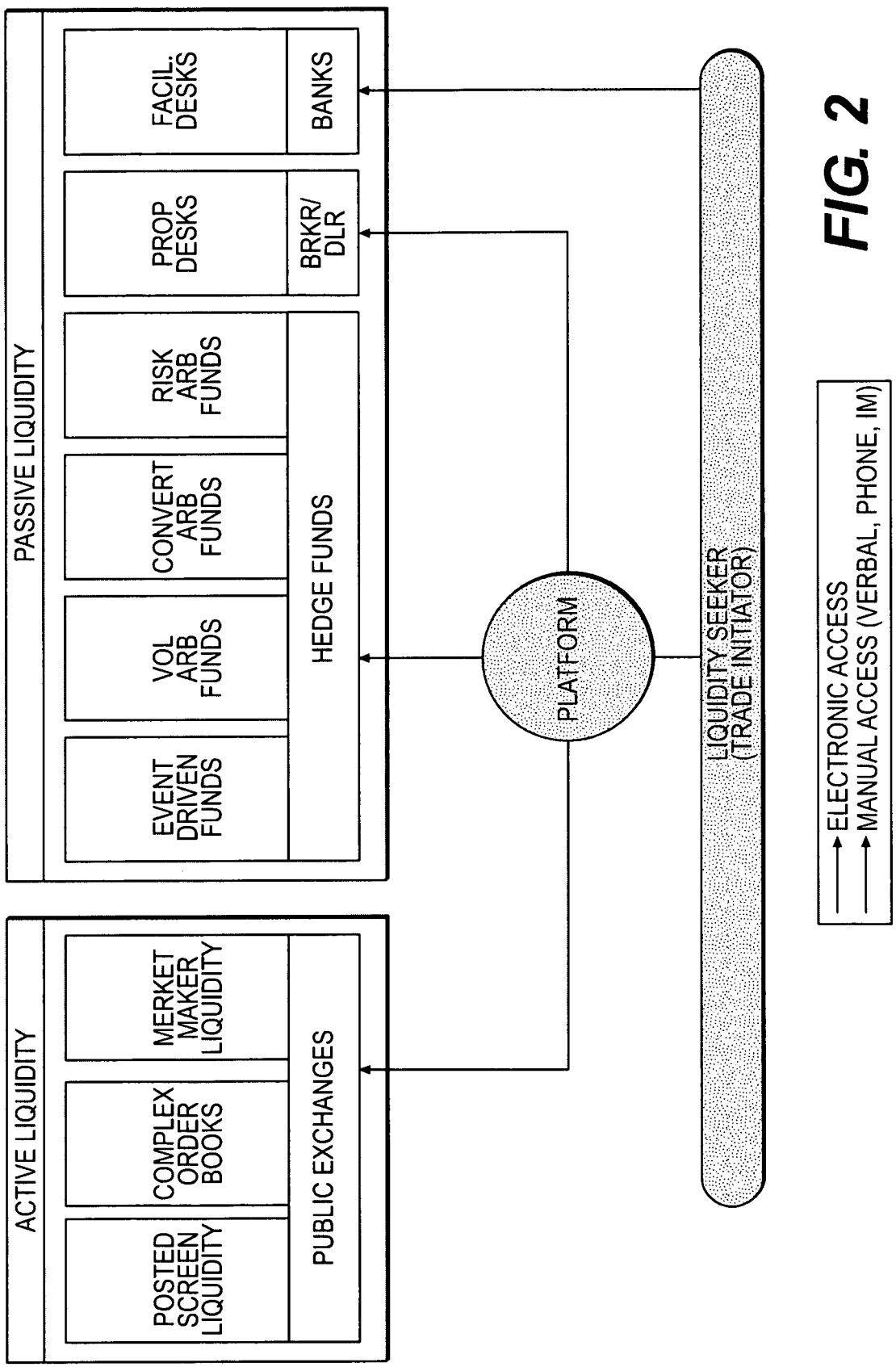
FIG. 2 depicts a diversity of clients and exchanges through with which the platform interacts for the purpose of initiating trades of securities according to an embodiment of the present invention.

FIG. 2 depicts an illustrative view of the platform in the context of sources of liquidity and a liquidity seeker seeking to trade securities, and particularly trade securities through orders having at least one options leg such as a tied transaction or block options trade. This figure illustrates the platform 200 communicating and exchanging information with sources of active liquidity and passive liquidity to facilitate a trade using the platform with a liquidity seeker.

In this regard, the liquidity seeker is given access to liquidity from public exchanges, including posted screen liquidity, complex order books, and market maker liquidity. The liquidity seeker is further given access to passive liquidity, which is generally unknown until a particular offer or query is made. The passive liquidity may include, for example and as shown, liquidity from hedge funds, such as event driven funds, voluntary arb funds, convertable arb funds, and risk arb funds. The passive liquidity may further come from broker dealers and prop desks and from banks and their facilitation desks. Today, there is no unified system for aggregating or accessing this passive and active liquidity and a broker or middleman is generally required for trading, which is conducted through phone calls, email and instant messaging to aggregate the liquidity. This process for complex trades having at least one options leg may take several minutes to several hours. The platform 102 provides aggregation of passive and active liquidity that provides an automated trading market to facilitate consummating trades, particularly those involving at least one options leg, between an initiator and various sources of liquidity and then crossing the options legs and printing any stock legs on as appropriate on public exchanges.

Figure 3:
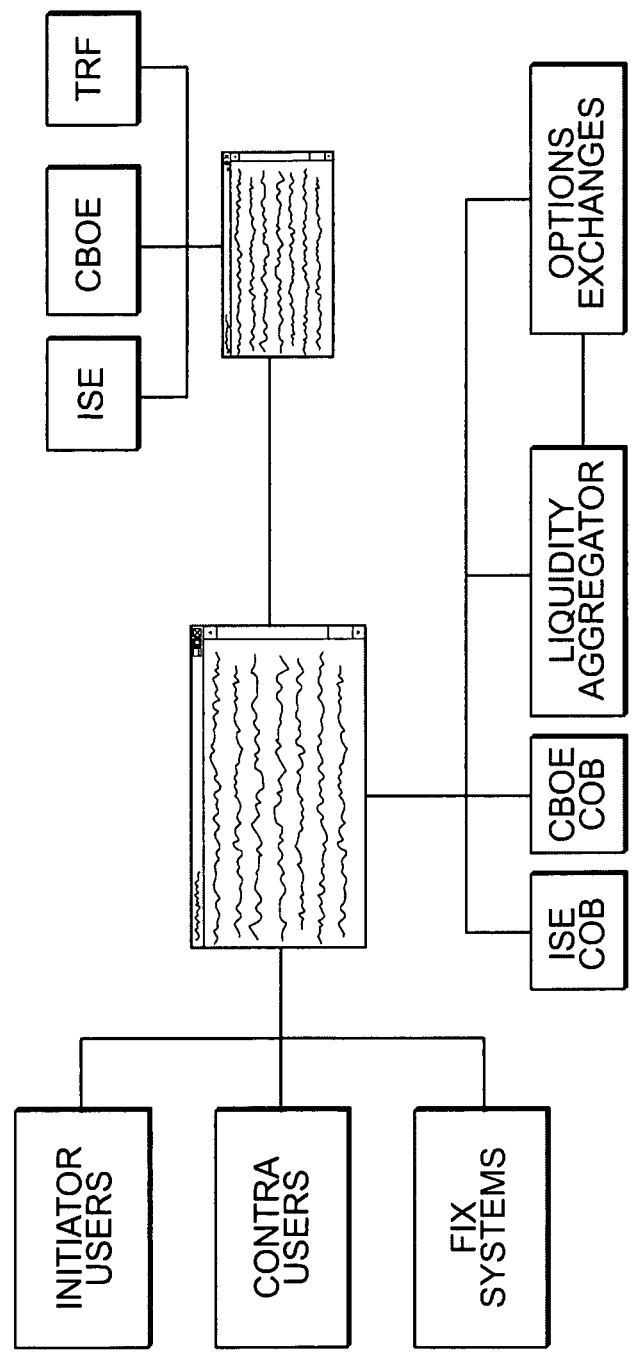
FIG. 3 depicts a functional bock diagram of the platform for trading securities against liquidity according to an embodiment of the present invention.

FIG. 3 depicts an illustrative functional block diagram showing different inputs into the exchange facility according to embodiments of the present invention. Referring to FIG. 3, an exchange facility 320 is positioned in the middle between initiator users 305 who initiate trades, preferably having at least one options leg, contra users which are a source of passive liquidity and other trading systems, including automated trading systems 315 with FIX type interfaces which are a further source of liquidity. The trading facility 320 is further coupled to exchanges, for example the ISE and CBOE exchanges 325 and 330 and to options exchanges 340. In addition, a liquidity aggregator 335, which may be part of the exchange facility 320, receives liquidity from different options exchanges and aggregates liquidity in individual securities identified in different books on the exchanges.

The exchange facility 320 then performs an auction and matching function described above to permit traders, including the initiating trader, to trade against liquidity internal to the platform and liquidity external to the platform accessible through connections to the various exchanges. Completed transactions are crossed on the relevant exchanges and in a tied transaction the stock component is reprinted and published on an exchange, such as one of the exchanges 345, 350 or 355.

Figure 12:
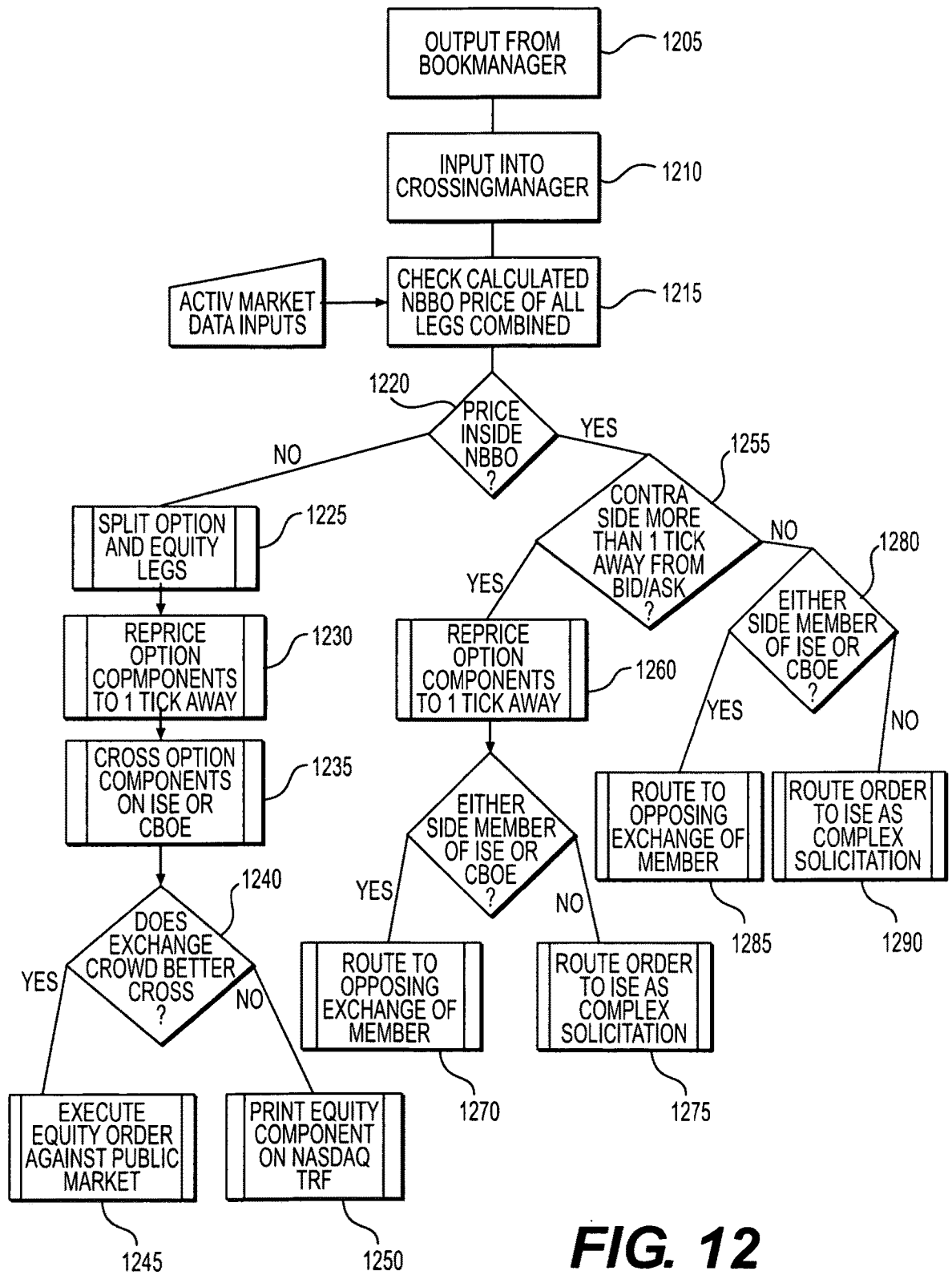
FIG. 12 depicts an illustrative method for crossing and reprising trades with at least on options leg according to an embodiment of the present invention.

FIG. 12 depicts an illustrative method for crossing and reprising trades with at least on options leg according to an embodiment of the present invention. Referring to FIG. 12, in step 1205, a consummated trade is output from the book manager. In step 1210, the trade details including but not limited to price, securities and volume information is input into the crossing manager. In step 1215 the crossing manager checks the NBBO price of all legs combined based on input from market data inputs, such as through market data inputs 170 and 175. In step 1220, the crossing manager determines whether the price is inside or outside NBBO on a market exchange. In step 1225, of it is not inside the NBBO, then the option is split from any equity legs. In step 1230, the option components are repriced to one tick away. In step 1235, the option components are crossed on ISE, CBOE or another exchange. In step 1240, the exchange the crossing manager determines whether the exchange is better for the cross. If so, the equity order is executed against the public market in step 1245. If not, the equity component is printed on the Nasdaq TRF.

If in step 1220 the price of the options legs are inside NBBO, then in step 1255 if the contra side is more than 1 tick away from the bid ask then in step 1260, the option components are repriced to 1 tick away. In step 1265, if either side of the trade is a member of ISE, CBOE or another exchange as determined in step 1265, then in step 1270 the order is routed to the opposing exchange of the member. If not, then in step 1275 the order is routed to ISE (or another exchange) as a complex solicitation.

If in step 1255 the contra side is not more than 1 tick away from bid/ask then in step 1280 if either side is a member of ISE or CBOE (or another exchange) then in step 1285 the order is routed to the opposing exchange of the member. If not, then in step 1290, the order is routed to ISE as a complex solicitation.

Workflow

Figure 4:
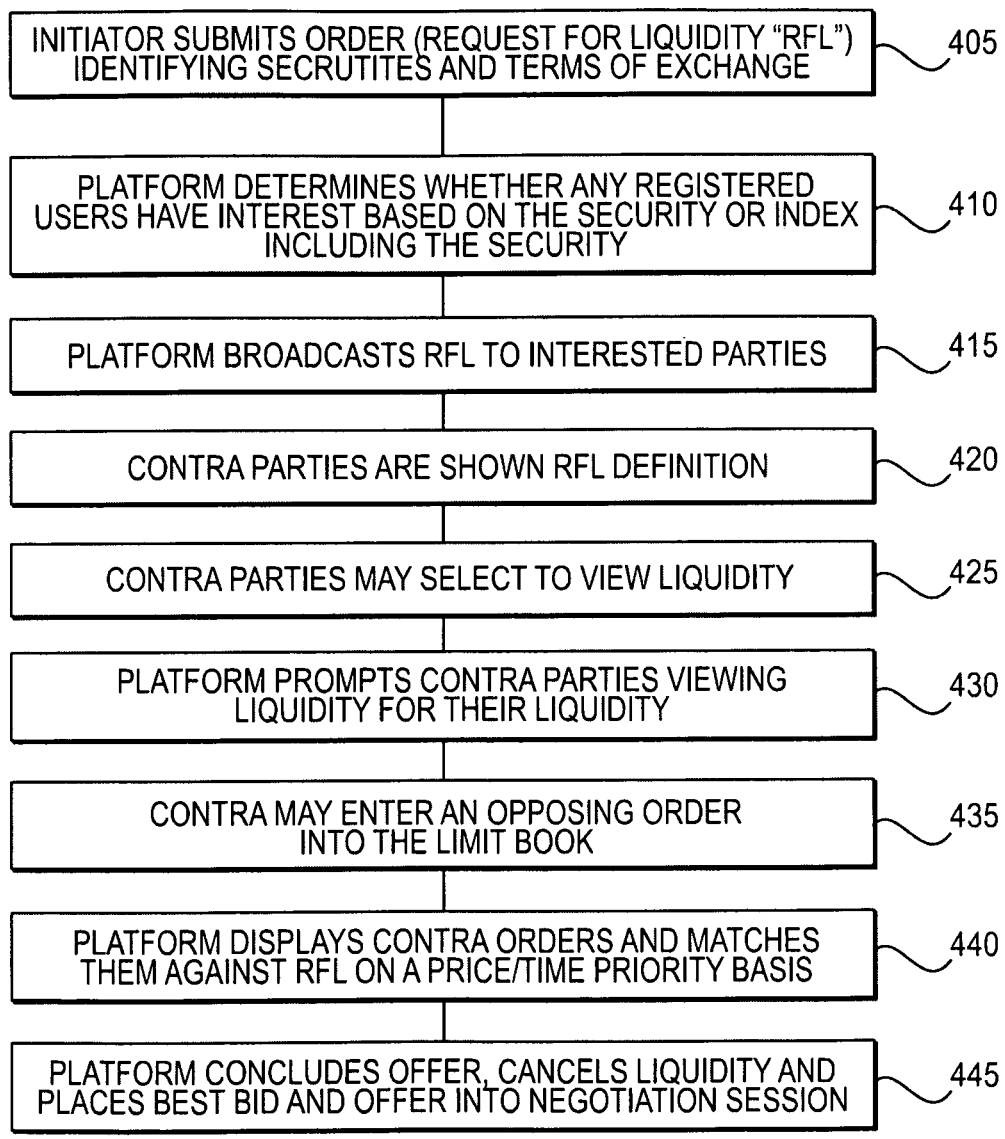
FIG. 4 depicts a work flow method for receiving initiated requests for liquidity, liquidity and trading against the identified liquidity according to an embodiment of the present invention.

FIG. 4 depicts a workflow, which is a method 400 of trading according to an embodiment of the invention. Referring to FIG. 4, in step 405, an initiator submits an order via one of the user terminals 105 to the platform 100. The order is also referred to as a request for liquidity and generally includes at least one option leg and specifies the securities for trading and the terms of the trade. For example, in a tied transaction, the order specifies a particular option symbol, a particular number of contracts and a particular stock symbol and associated trading volumes as well as other order parameters, including prices and optionally minimum volumes and other terms. In a block options trade, the order may specify one or more options by symbol, the volume of each for trading and optionally minimum volumes and other terms.

In step 410, the platform receives the order information from the initiating user of the platform and determines whether any registered users of the platform have expressed interest based on the security or index including the security. Users express interest through their profile, maintained in the platform database, which allows users to set filters so that they only receive offers relative to individual securities or securities on particular indices.

In step 415, the platform broadcasts messages in response to the initiating offer or request for liquidity to the parties identified as interested in trades involving the security identified in the offer or request for liquidity. In step 420, the user terminals receive the messages from the platform and display one or more pending requests for liquidity involving securities in which the user has expressed interest. The display may comprise, for example, the definition of the order through a user interface screen on the user's terminal that may be browser based or may use any other technique for creating interactive displays.

In step 425, each user of the system may select to view liquidity associated with one or more pending offers or requests for liquidity through the user's terminal. The user's terminal, in response to the selection from an interactive display, sends information corresponding to the user's selection to the platform over a network connection. In step 430, the platform then returns a message to the user's terminal providing liquidity information corresponding to the pending offer and prompts the contra party viewing the liquidity to enter their liquidity. In step 435, each contra party enters, if desired, each contra party's liquidity. This may comprise entering an opposing order into the limit book for the securities associated with the initiating offer or request for liquidity. In step 440, the platform displays contra orders and matches them against the initiating offer and request for liquidity on a price and time priority bases. Because the initiating offer may choose to leverage a minimum trading size parameter, it is possible that matches against an initiating order are grouped or queued by the platform until such time that enough liquidity exists at the specified price level to fill the initiator defined minimum order.

Figure 5:
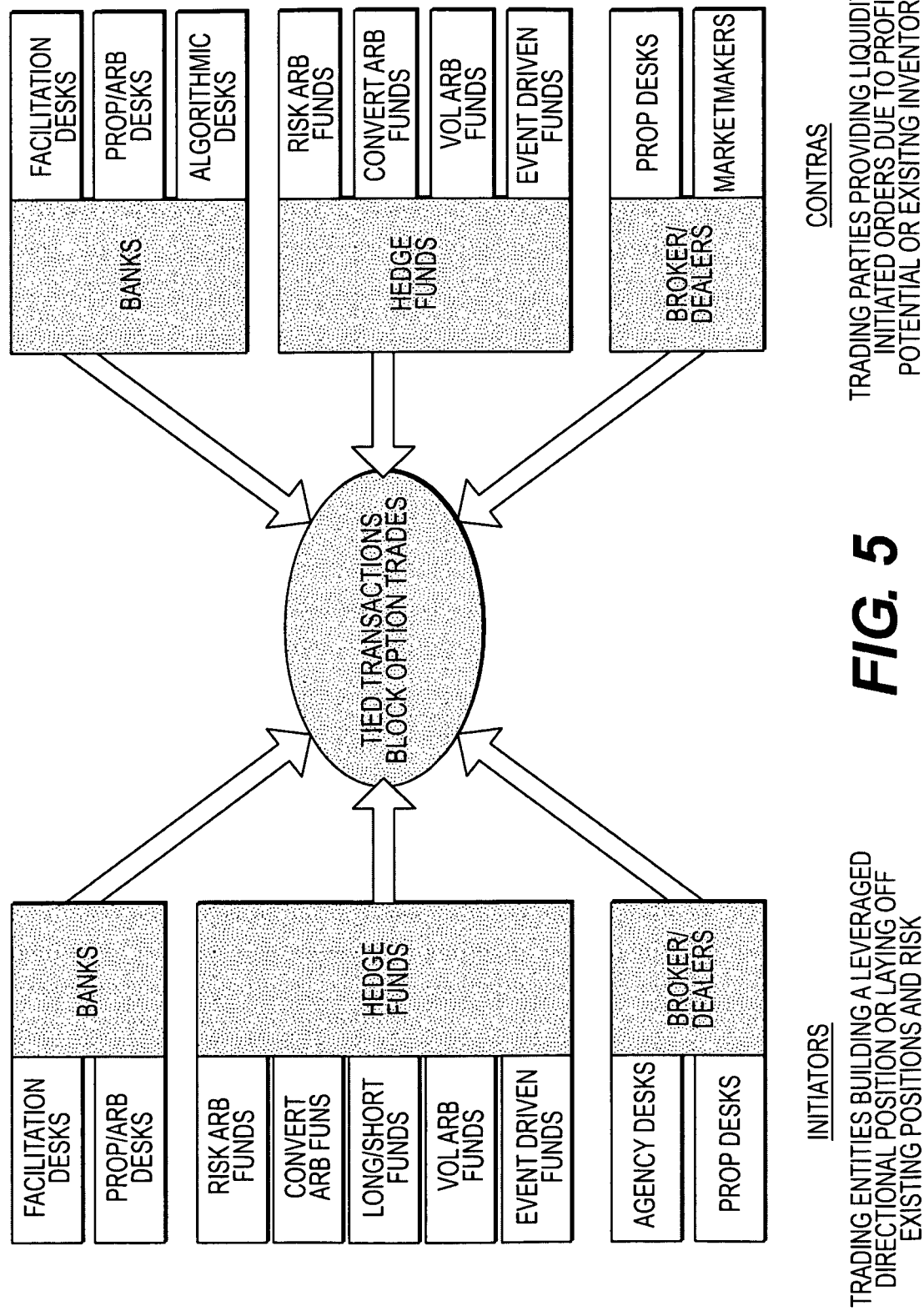
FIG. 5 depicts an illustrative view of different market participant entities utilizing a platform according to an embodiment of the present invention.

Each initiator may enjoy a period of exclusivity for the precise order entered into the platform, which may be, for example, five minutes during which trading occurs and liquidity is posted against the initiator's order. In step 445, the platform concludes the offer, cancels any unmatched liquidity and places the remaining best bid and offer into a negotiation session to facilitate an exchange on terms mutually beneficial but potentially different from the original terms of the initiator's offer. The platform also performs crossing and publishing of stock prices on exchanges for the consummated transactions. In this manner, the platform is leveraged to quickly and efficiently identify active and passive liquidity and facilitate trading securities and particularly trading securities with at least one options leg in an efficient and relatively automated manner across a range of market participants and public exchanges. The platform further allows a range of parties to directly interact on securities of mutual interest, agree to terms of a trade, and then allow the system to automatically cross the trade on an options exchange. FIG. 5 depicts an illustrative view of different market participants that may use the platform to advantage to trade securities, and in particular securities with at least one options leg such as tied transactions or block options trades.

User Interface

The user interface or graphical user interface (GUI) component of the platform reflects a number of features that permit and facilitate identifying and trading against active and passive liquidity across a range of market participants and exchanges in an automated manner.

Figure 6:
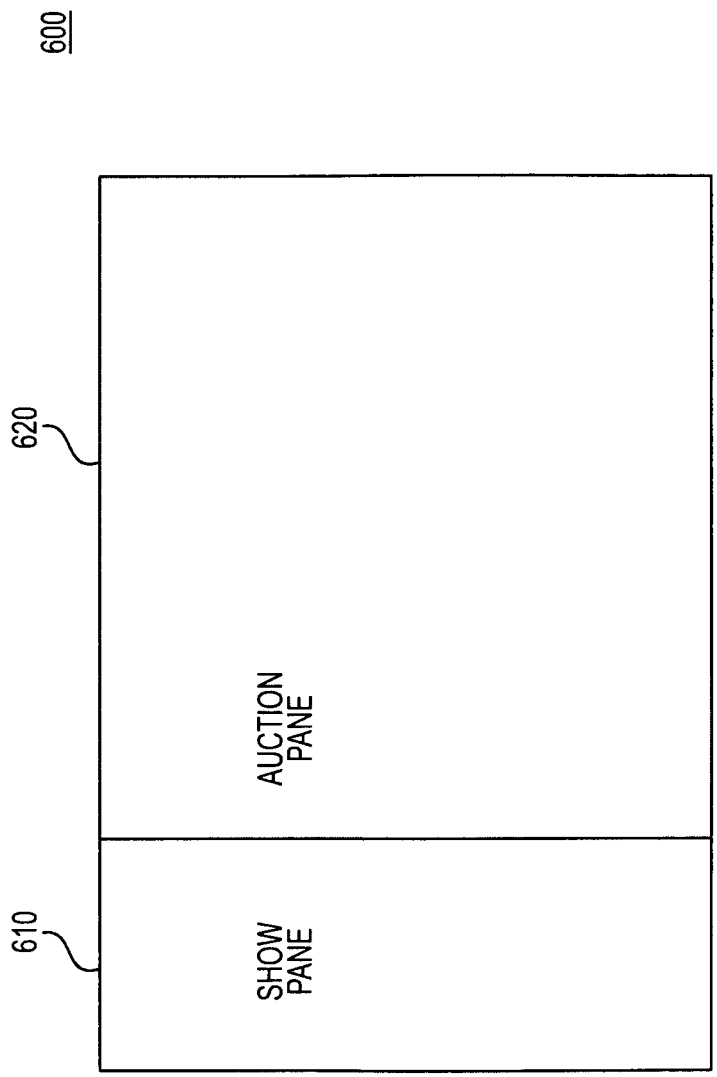
FIG. 6 depicts an illustrative view of a graphical user interface format based on a display of pending offers and auctions according to an embodiment of the present invention.

According to an embodiment of the invention, the GUI is configured to allow users to track incoming shows, which are initiated and active orders and also to separately view liquidity for the shows or offers and interact with the visible order book of liquidity associated with particular offers. FIG. 6 depicts an illustrative view of a GUI 600, which includes a show pane 610 and an auction pane 620. The show and the auction panes also correspond to functionality of the platform, which pushes offers out to the show panes of users who have indicated interest in a particular security being traded and which enables further interaction in the auction context once the user has selected that he or she wishes to view liquidity associated with a particular offer. This brings up an interactive display in the auction pane corresponding to the selected order and allows participation by the user in the auction and allows the user to enter his or her liquidity.

In this regard, incoming shows transmitted as messages to the user terminal, which presents them, for example through a web interface, to the show pane, give a general description of the incoming order initiated by an initiating user of the system. The incoming shows are routed based on a user's specific request to view a symbol, sector, or index containing the symbol.

The incoming shows are presented with information regarding the requested order or request for liquidity (RFL). The details regarding the initiated side of the order may be included or removed to streamline the presentation of pending orders. When removed, for example, only descriptive information regarding the incoming show is presented to the user. That is, the show consists of a "transaction definition" which defines the legs that are part of the overall transaction, without giving visibility into the side or price the initiator has sent.

If a trading party has interest in providing an order for that set of components as a single transaction, he may do so by dragging the offer or request for liquidity from the show pane to an available window within the Auction Pane. According to an embodiment of the invention, the auction pane may have multiple panes, and the user may drag the offer to one of the panes. In this manner the user may view multiple shows and may participate in multiple auctions. Moreover, the platform 100, through the interactive display, receives information from the user terminal whenever the user views liquidity within a specific auction. The platform may further optionally require the user to reply with its own liquidity in order to encourage a fair marketplace by reducing use as an information tool only.

Figure 7:
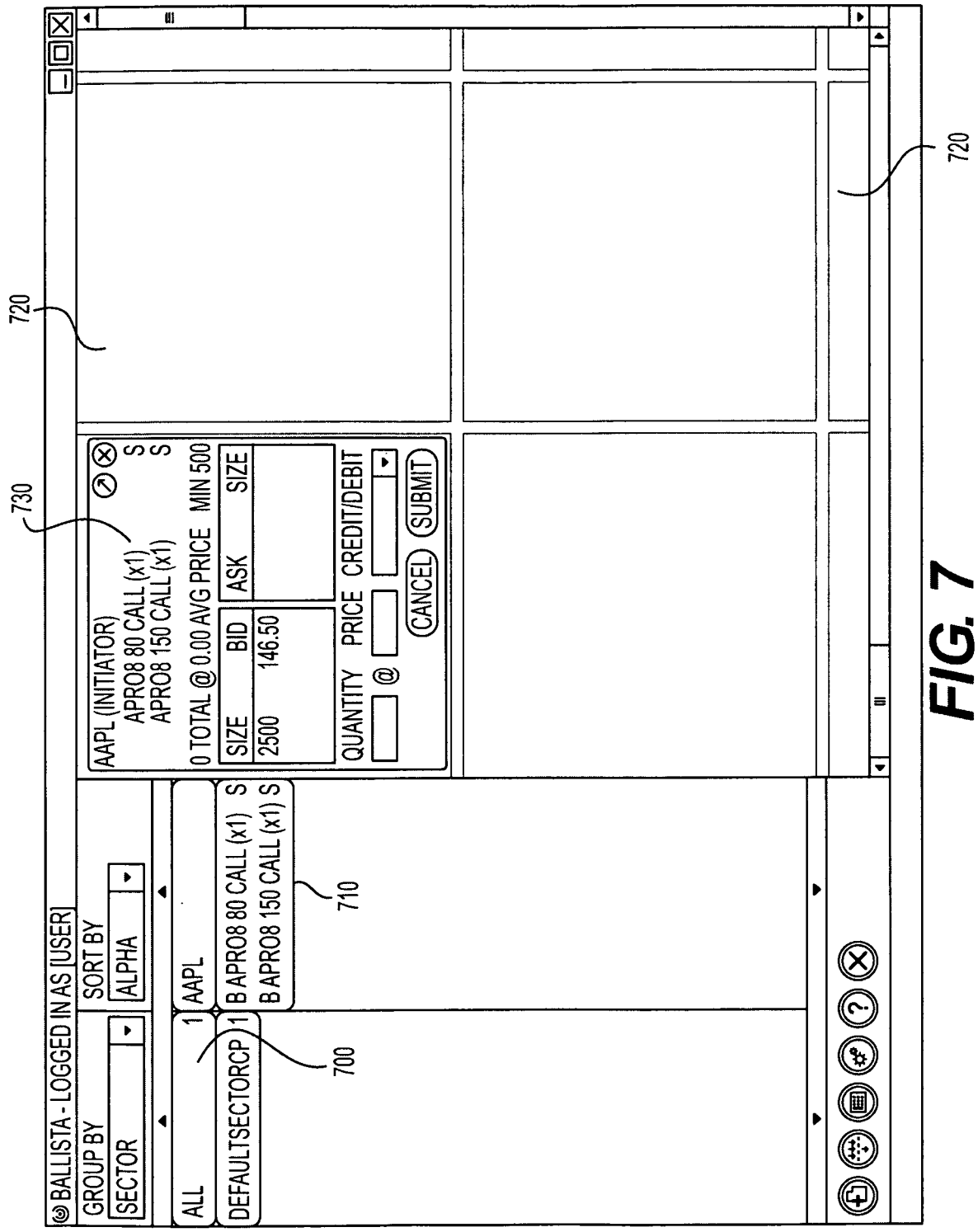
Figure 9:
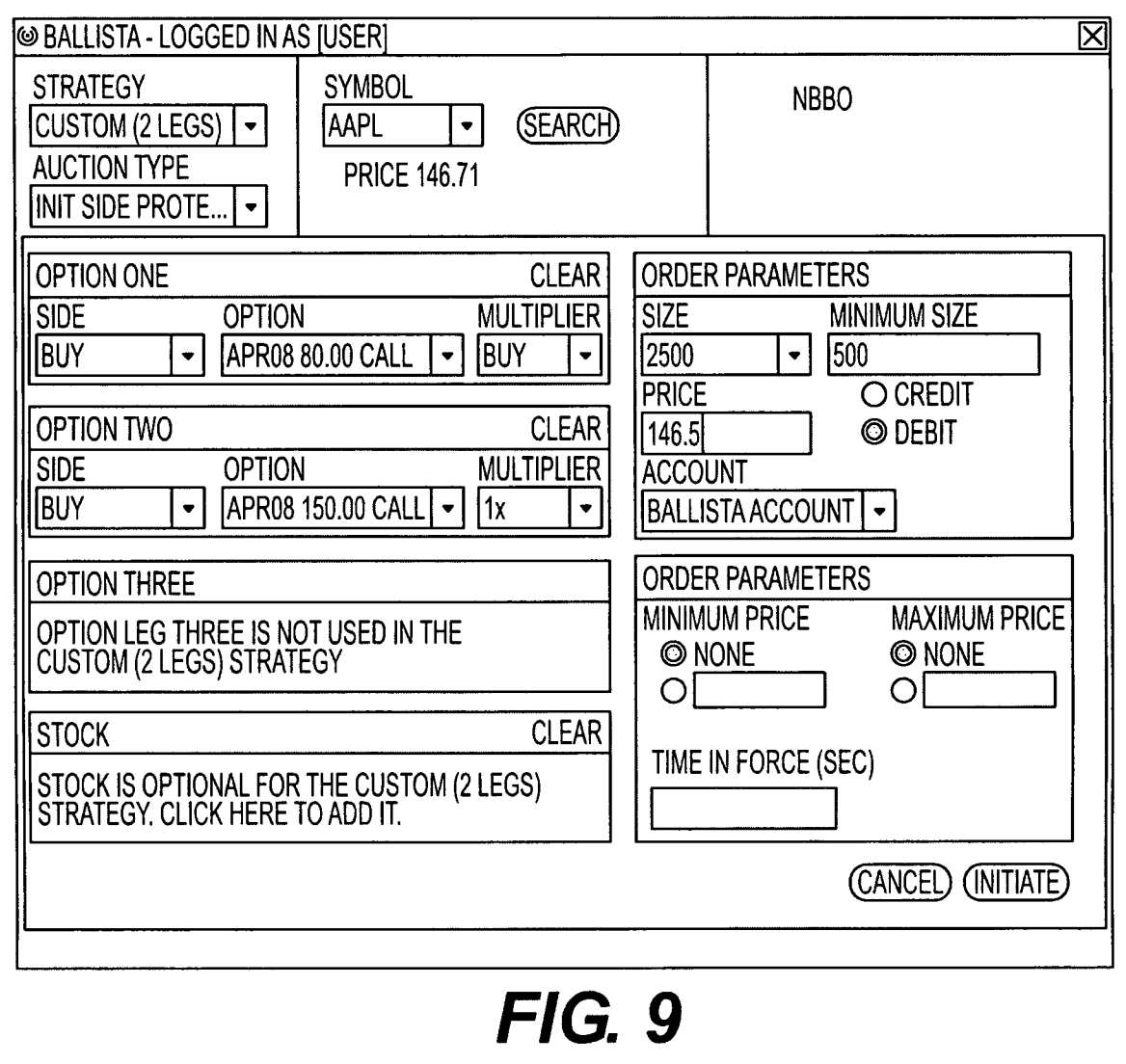

Illustrative views of the GUI according to an embodiment of the invention are further shown in FIGS. 7-9. The GUIs described herein are displayed on user terminals 105 and may be provided through a browser interface resident on the user terminals that receive content from one ore more of the server elements within the platform via a network. Alternatively, the GUI may be created via custom software stored locally on the user's terminal or served remotely from one of the servers within the platform. In any case, the GUI is interactive and allows the display of information received from one or more servers within the platform and also receives input from users and transmits information based on this input, typically user entered information and selections, back to one or more of the servers within the platform.

FIG. 7 depicts a graphical user interface that may be displayed on a user terminal 105. Referring to FIG. 7, the GUI includes a show pane 700 and an auction pane 740. The show pane includes enough space to show multiple orders or requests for liquidity. In FIG. 7, the request for liquidity 710 is shown with respect to a block trade for particular options associated with stock symbol AAPL. Some details of the order 710 are displayed in the show pane. In addition, when the user selects the offer within the show pane, the user is given additional information about the offer in the auction pane 740. Moreover, as is apparent, there may be multiple sub-panes 720 within the auction pane into which the user may place the auction screen associated with the selected offer. The auction screen present the user with an interactive display which provides the user additional information about the auction, including but not limited to the size and price of bids; the size and price of asks, and whether there is a minimum volume. The user is also given an opportunity to enter information for a contra position by entering a quantity and a prices and credit or debit. This information, once entered, may be canceled or submitted to the platform, which then receives the information via messaging between the user terminal and the servers within the platform.

FIG. 8 depicts a more detailed view of an auction screen for an offer for options, associated with the same AAPL securities. As is apparent, additional information is provided on total traded volume, average prices, and details of the trade and size. In addition, the user is given the option to enter additional information including a minimum quantity associated with the offer, and minimum or maximum prices, and a time in force for the offer. The user may also specify an account to use to satisfy the order. Again, the entered information may be submitted or canceled through selection of corresponding buttons within the GUI.

FIG. 9 depicts an illustrative GUI that may be provided to a user who wishes to initiate an offer or request for liquidity according to an embodiment of the invention. Referring to FIG. 9, the user is prompted to provide various information used in formulating an order. A GUI may be constructed to allow easy entry of any information associated with an offer and FIG. 9 is merely illustrative of an approach. The user may enter, for example a strategy, such as a custom (2 legs) order, a tied transaction, a block option trade or any other order reflecting a particular strategy. The strategies may be any types of trading strategies, including exclusive and phantom trades. Pursuant to the exclusive strategy, the initiator is given exclusivity for a period of time. Pursuant to phantom, the initiator's offer is hidden from contras on the platform. The user may further enter an auction type to be carried out by the platform in response to the offer. Any type of auction is contemplated here. One example is a timed auction. The user may further enter a symbol and be shown the current price of the symbol or may search for a symbol.

The user may be presented with multiple options for defining legs of a complex securities transaction. For example, as shown, the user is prompted to enter details with respect to option legs one, two and three of the transaction. The user may be prompted to enter, for example, whether the order is for the buy or sell side, the particular option, for example April 08 80.00 Call and a multiplier. The GUI may also include clear buttons to clear entered information. The user may further be given messages, such as option leg three is not used in a two legged options transaction as shown.

Still further, the user may be provided with the option of entering additional information associated with a complex trade, such as whether the user will add stock or other securities transactions to the order. The user will then be prompted for details about this security associated with the offer to trade as well.

The user is also prompted for additional information about the order, including parameters such as the total size of the order, minimum size, price, account and account information associated with the order. The platform may maintain accounts associated with registered users. In addition, the offer may include cancellation parameters that are displayed and entered through the GUI, such as minimum price, maximum prices and time in force. When the user has finished entering information about the offer, the user may initiate or cancel the order by selecting buttons. When the user selects initiate, the offer or request for liquidity is sent to the system through messaging between the user terminal and servers within the platform which causes the platform and the exchange facility to begin an auction procedure to broadcast the offer, receive liquidity and conduct and auction and any necessary negotiation to consummate a transaction, if possible, which is then crossed on an options exchange automatically.

Figure 10:
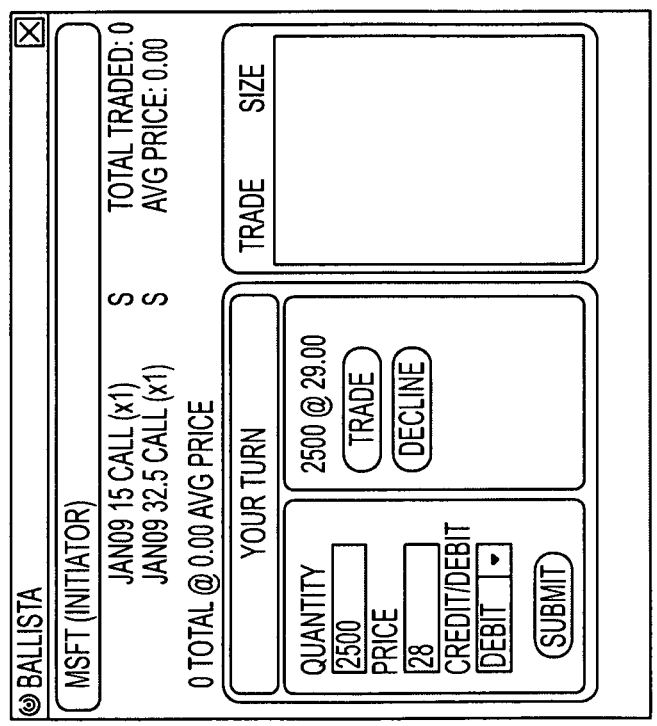

FIG. 10 depicts another GUI corresponding to a negotiation conducted within the platform between at least two users of the platform. The negotiation allows parties to communicate offers to each other until the offers match, and therefore the parties are in agreement with respect to consummating a transaction. The GUI may include, as shown, information about the initiated offer that is the subject of the negotiation and additional windows into which to enter information such as a quantity, price, credit/debit specification and trade or decline information. The GUI further displays any outstanding offer information such as whose turn it is, price and quantity information which the user may agree to by selecting trade. In this manner, parties with in interest in the same security are identified through interaction with the platform and negotiation between such interested parties on the platform is facilitated automatically through user interfaces.

Figure 11:
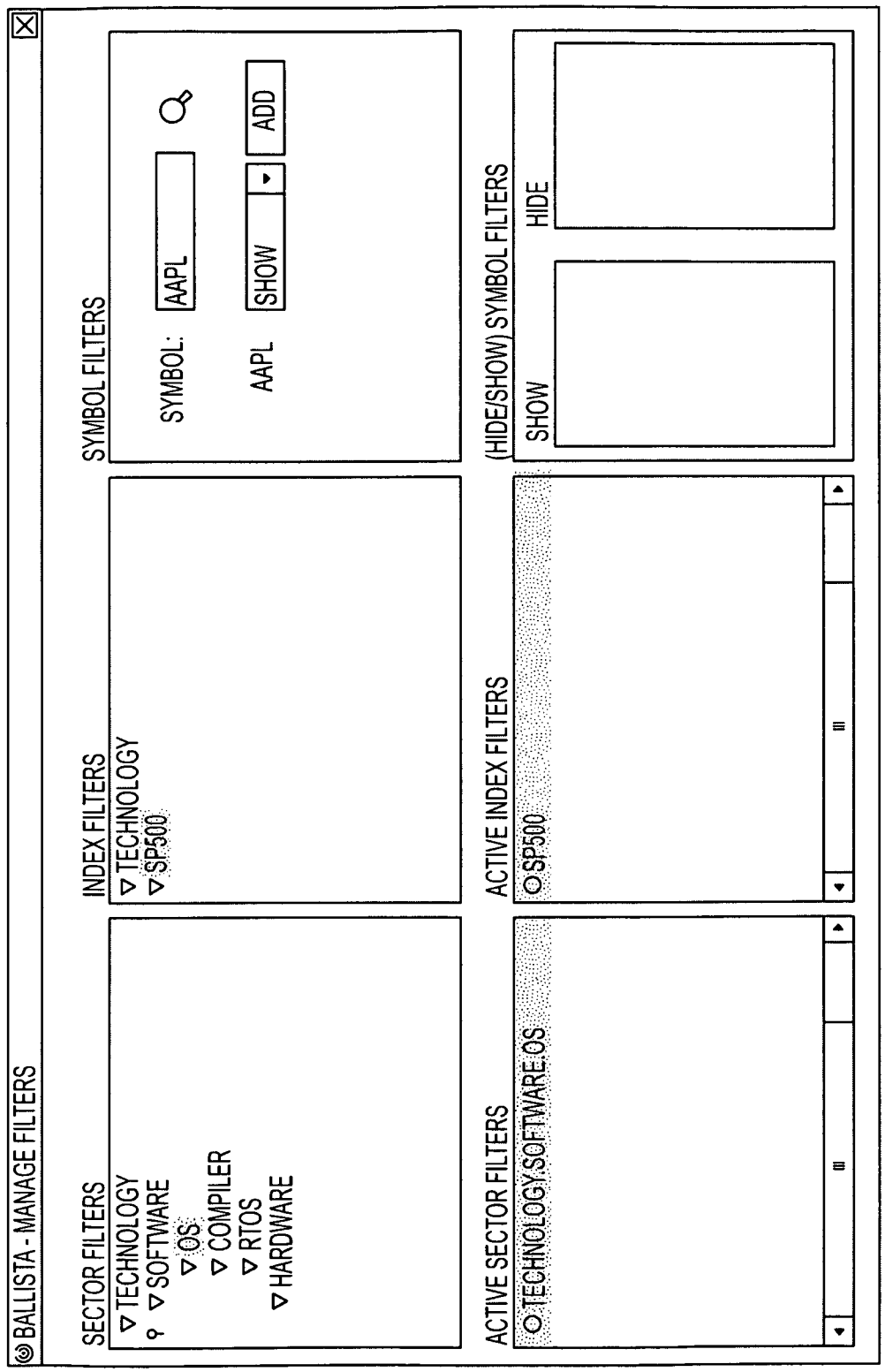

FIG. 11 depicts still another GUI that may be associated with the platform. Referring to FIG. 11, the platform allows users to set up different filters that are used to select which securities the user has an interest in for the purpose of trading and declaring liquidity. The GUI provides several illustrative windows that may be used for this purpose. FIG. 11, which includes a sector filter, index filter, symbol filter, and active sector or index filters allows users a substantial amount of flexibility to inclusively filter individual securities and securities grouped by various criteria. In addition, the user can establish a baseline list and then selected particular filters as active during different time periods.

While particular embodiments of the invention have been shown and described herein, it will be understood that changes may be made to those embodiments without departing from the spirit and scope of the present invention. Moreover, all of the components described herein, particularly the user terminals and other elements of the platform may be implemented as general purpose computer systems with one or more processors, memory, input devices, network interfaces, and output devices such as displays. Moreover, the functionality described as associated with the GUI, workflows and the platform generally may be implemented in software resident on one or more computer systems in memory. In this regard the computer, through its one or more processors, processes the computer program logic, generally computer program instructions comprising the software, to configure the various systems to perform the functionality and exchange the information and messaging described herein.

What is claimed is:

1. A system, comprising:
   at least one external electronic exchange system;
   one or more client terminals; and
   an electronic trading platform in communication with the at least one external electronic exchange system and the one or more client terminals over at least one network, the electronic trading platform comprising:
   one or more servers in communication with each other, each of said servers comprising a memory storing program instructions and at least one processor executing said program instructions;
   a database embodied on at least one of said one or more servers, the database storing user profiles for a plurality of users registered to use the electronic trading platform, one or more of the user profiles holding interest criteria associated with a respective user, the interest criteria indicating one or more trade offers that the respective user is interested in receiving;
   at least one data handler embodied on at least one of said one or more servers and coupled to the at least one external electronic exchange system receiving information feeds from the at least one external electronic exchange system;
   a proxy; and
   a book manager embodied on at least one of said one or more servers,
   at least one of said one or more servers executing program instructions for exchanging information with the one or more client terminals, said program instructions causing the at least one of said one or more servers to:
   generate an interactive graphical user interface (GUI) that comprises a first pane and a second pane to be displayed on said one or more client terminals, the first pane independent of the second pane;
   receive, via the proxy, at least two offers to trade a security having an option leg from at least one of said client terminals;
   identify, via the book manager, a portion of users among the plurality of users interested in the at least two offers by:
   querying one or more of the user profiles within the database to retrieve respective interest criteria, and
   determining whether offer information associated with each of the at least two offers complies with the retrieved respective interest criteria to identify the portion of users having compliant interest criteria;
   broadcast the at least two offers by populating said at least two offers in the first pane of the interactive GUI, said interactive GUI being displayed on said corresponding one or more client terminals;
   for each offer of the at least two offers, conduct an auction having a defined period among the identified portion of users;
   monitor the one or more client terminals to identify an input from at least one of the one or more client terminals; and
   upon identifying the receive input from at least one of the one or more client terminals, said input comprising a drag and drop command that drags a first offer of said at least two offers from the first pane of the interactive GUI and drops said first offer into to the second pane of the interactive GUI, said drag and drop input triggering trigger the at least one of said one or more servers to pull live liquidity information from said at least one external exchange system and to generate of an embedded interactive interface within the second pane, said embedded interactive interface populated with the displaying live liquidity information associated with the auction corresponding to said first offer, said live liquidity information being pulled from said at least one external electronic exchange system, wherein said live liquidity information is not visible and not generated unless and until said drag and drop input is received.

2. The system of claim 1, wherein executing programming instructions further causes the at least one of said one or more servers to:
   generate a second type of liquidity information from among the information feeds received from the at least one external exchange based on each of the at least two offers;
   aggregate the live liquidity information and the second type of liquidity information to form aggregated liquidity information; and
   initiate a transaction based on the aggregated liquidity information.

3. The system according to claim 2, wherein at least one of said servers executes program instructions for consummating a trade based on at least one offer of the at least two offers and the aggregated liquidity information.

4. The system according to claim 3, wherein at least one of said servers executes program instructions for generating the second type of liquidity information from at least one public exchange and consummating the trade based on at least one of the at least two offers.

5. The system according to claim 4, wherein at least one of said servers executes program instructions for concluding the defined period auction without consummating a transaction and initiating a negotiation between an initiator of at least one of the at least two offers and at least one losing bidder of the defined period auction.

6. The system according to claim 5, wherein the negotiation is between the initiator of at least one of the at least two offers and a closest losing bidder.

7. The system according to claim 1, wherein at least one of said servers executes program instructions for concluding the defined period auction without consummating a transaction and initiating a negotiation between an initiator of at least one of the at least two offers and at least one losing bidder of the defined period auction.

8. The system according to claim 7, wherein the negotiation is between the initiator of at least one of the at least two offers and a closest losing bidder.

9. The system according to claim 1, wherein auctions in a particular security are exclusive to an initiating bidder in the defined period auction for a period of time.

10. The system according to claim 1, wherein at least one of said servers executes program instructions for, upon consummation of a trade, of automatically crossing the options legs on at least one public exchange.

11. The system according to claim 10, wherein the trade includes a stock component and at least one of said servers executes program instructions for accounting for price changes of the options legs resulting from crossing on public exchanges and offsetting the price from the stock component.

12. The system according to claim 1, wherein the trade comprises at least one of a tied transaction or a block option trade.

13. A method, comprising:
providing an electronic trading platform, in communication with at least one external electronic exchange system and one or more client terminals over at least one network, the electronic trading platform comprising one or more servers in communication with each other, at least one data handler embodied on at least one of said one or more servers and coupled to the at least one external electronic exchange system receiving information feeds from the at least one external electronic exchange system, each of said servers comprising a memory storing program instructions and at least one processor executing said program instructions;
providing a database embodied on at least one of said one or more servers, the database storing user profiles for a plurality of users registered to use the electronic trading platform, one or more of the user profiles holding interest criteria associated with a respective user, the interest criteria indicating one or more trade offers that the respective user is interested in receiving;
at least one of said servers executing program instructions for generating an interactive graphic user interface (GUI) comprising a first pane and a second pane to be displayed on one or more client terminals, the first pane independent of the second pane;
setting, via the at least one of said client terminals, an interest criteria for trade offers having at least one option leg;
receiving, by the electronic trading platform from at least one of said client terminals, at least two offers to trade a security having the at least one option leg;
identifying a portion of users among the plurality of users interested in the at least two offers by:
    querying one or more user profiles within the database to retrieve respective interest criteria, and
    determining whether offer information associated with the at least two offers complies with the retrieved respective interest criteria to identify the portion of users having compliant interest criteria,
broadcasting the at least two offers by populating said at least two offers in the first pane of the interactive GUI said interactive GUI being displayed on said corresponding one or more client terminals;
for each offer of the at least two offers, conducting an auction having a defined period among the identified portion of users;
monitoring the one or more client terminals to identify an input from at least one of the one or more client terminals; and
upon identifying receiving the input from at least one of the one or more client terminals, said input comprising a drag and drop command that drags a first offer of said at least two offers from the first pane of said interactive GUI and drops said first offer into to the second pane of said interactive GUI, said drag and drop input triggering the at least one of said one or more servers to pull live liquidity information from said at least one external exchange system and to generate an embedded interactive interface within the second pane, said embedded interactive interface populated with the displaying live liquidity information associated with the auction corresponding to said first offer, said live liquidity information being pulled from said at least one external electronic exchange system, wherein said live liquidity information is not visible and not generated unless and until said drag and drop input is received.

14. The method of claim 13, further comprising:
generating a second type of liquidity information from among information feeds received from the at least one external exchange based on the at least one offer;
aggregate the live liquidity information and the second type of liquidity information to form aggregated liquidity information; and
initiating a transaction based on the aggregated liquidity information.

15. The method according to claim 13, further comprising:
providing an indication to at least one other user whether the at least one other user consummated a trade based on the provided information.

16. The method according to claim 15, further comprising:
prompting the at least one other user to negotiate with an entity that initiated at least one of the at least two offers if the trade is not consummated.

17. The method according to claim 16, further comprising:
prompting the at least one other user through an electronic interface to provide information used to negotiate with the entity;
transmitting electronic information between the at least one other user and the entity of at least one of the at least two offers; and
consummating a transaction based on at least one of the at least two offers when the at least one other user and entity agree.

18. A method, comprising:
providing an electronic trading platform, in communication with at least one external electronic exchange system and one or more client terminals over at least one network, the electronic exchange system comprising one or more servers in communication with each other, at least one data handler embodied on at least one of said one or more servers and coupled to the at least one external electronic exchange system receiving information feeds from the at least one external electronic exchange system, each of said servers comprising a memory storing program instructions, at least one processor executing said program instructions, and at least one database;
providing a database embodied on at least one of said one or more servers, the database storing user profiles for a plurality of users registered to use the electronic trading platform, one or more of the user profiles holding interest criteria associated with a respective user, the interest criteria indicating one or more trade offers that the respective user is interested in receiving;
executing, by the at least one of said servers, program instructions for exchanging information with the client terminals that causes the at least one of said servers to:
generate an interactive graphical user interface (GUI) that comprises a first pane and a second pane to be displayed on said one or more client terminals, the first pane independent of the second pane;
receive at least two offers to trade a security having an option leg from at least one of the client terminals;
identifying a portion of users among the plurality of users interested in the at least two offers by:
    querying one or more of the user profiles within the database to retrieve respective interest criteria, and
    determining whether offer information associated with each of the at least two offers complies with the retrieved respective interest criteria to identify the portion of users having compliant interest criteria;

broadcasting the at least two offers by displaying populating said at least two offers in the first pane of the interactive GUI, said GUI being screen displayed on said corresponding one or more client terminals;

for each offer of the at least two offers, conducting an auction having a defined period among the identified portion of users;

monitoring the one or more client terminals to identify an input from at least one of the one or more client terminals; and upon identifying the receive input from at least one of the one or more client terminals, said input comprising a drag and drop command that drags a first offer of said at least two offers from the first pane of said interactive GUI and drops said first offer into to the second pane of said interactive GUI, said drag and drop input triggering the at least one of said one or more servers to pull live liquidity information from said at least one external exchange system and to generate an embedded interactive interface within the second pane, said embedded interactive interface displaying populated with the live liquidity information associated with the auction corresponding to said first offer, said live liquidity information being pulled from said at least one external electronic exchange system, wherein said live liquidity information is not visible and not generated unless and until said drag and drop input is received.

19. The method according to claim 14, further comprising:
consummating a trade based on at least one of the at least two offers and the aggregated liquidity information.

20. The method according to claim 19, further comprising:
generating the second type of liquidity from at least one public exchange; and
consummating the trade.

21. The method according to claim 20, further comprising:
concluding the defined period auction without consummating a transaction; and
initiating a negotiation between an initiator of at least one of the at least two offers and at least one losing bidder of the defined period auction.

22. The method according to claim 21, wherein the negotiation is between the initiator of at least one of the at least two offers and a closest losing bidder.

23. The method according to claim 18, wherein auctions in a particular security are exclusive to an initiating bidder in the defined period auction for a period of time.

24. The method according to claim 18, further comprising:
automatically crossing the options legs on at least one public exchange.

25. The method according to claim 24, wherein the trade includes a stock component, the method further comprising:
accounting for prices changes of the options legs resulting from crossing on public exchanges and offsetting the price from the stock component.

26. The method according to claim 18, wherein the trade comprises at least one of a tied transaction or a block option trade.

27. The system of claim 2, wherein the at least one of said one or more servers executes program instructions to automatically match at least one of the at least two offers with at least a portion of the aggregated liquidity information.

28. The system of claim 27, wherein the transaction is initiated in response to said automatic match.

29. The system of claim 1, wherein the second pane includes a plurality of sub-panes, each configured to display input associated with multiple auctions occurring simultaneously.

30. The system of claim 1, wherein executing programming instructions further causes the at least one of said one or more servers to:
receive further input from at least one of the one or more client terminals, said further input comprising a further drag and drop command that drags a second offer of said at least two offers from the first pane and drops said second offer into to the second pane, said further drag and drop input triggering generation of a second embedded interactive interface within the second pane, said second embedded interactive interface being independent of said first embedded interactive interface, said second embedded interactive interface displaying live liquidity information associated with another auction corresponding to said second offer simultaneously with the live liquidity information being displayed in the first embedded interactive interface.

* * * * *